W. H. DICKEY.
Chain-Link.

No. 221,795. Patented Nov. 18, 1879.

Witnesses:
H. N. Low,
J. S. Barker.

Inventor:
William H. Dickey
by H. H. Doubleday, atty

UNITED STATES PATENT OFFICE.

WILLIAM H. DICKEY, OF JACKSON, MICHIGAN, ASSIGNOR OF ONE-HALF OF HIS RIGHT TO GEORGE S. BENNETT, OF SAME PLACE.

IMPROVEMENT IN CHAIN-LINKS.

Specification forming part of Letters Patent No. 221,795, dated November 18, 1879; application filed August 16, 1879.

*To all whom it may concern:*

Be it known that I, WILLIAM H. DICKEY, of Jackson, in the county of Jackson and State of Michigan, have invented certain new and useful Improvements in Chain-Links; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The first part of this invention relates to a novel combination, with the hook of an open chain-link, of a bushing arranged within the hook, and adapted to receive the end bar of a similar open hook.

The second part of the invention relates to the construction of such bushing and the end bar, which is to be seated in it in such manner that the bushing can be rotated within the hook by means of the end bar.

Figure 1:
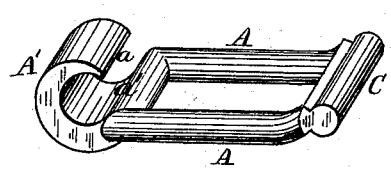
Figure 2:
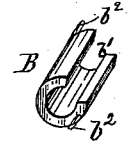
Figure 3:
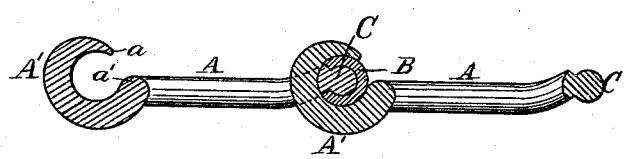
Figure 4:
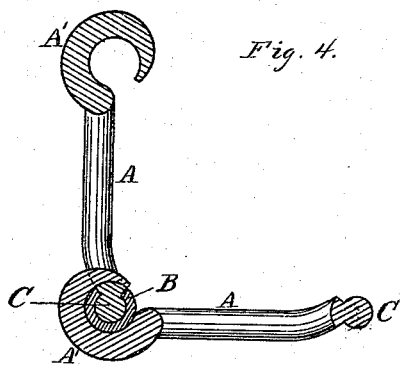
Figure 5:
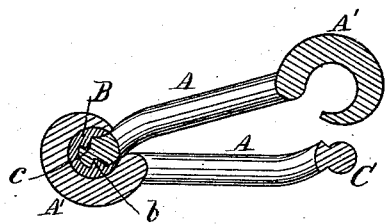
Figure 6:
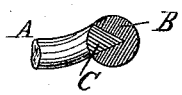

In the drawings, Figure 1 is a detached view of one link. Fig. 2 is a detached view of the bushing interposed between the hook and the engaging end bar. Fig. 3 is a view, in section, of the links in ordinary working position. Fig. 4 is a view, in section, of the two links arranged at right angles to each other. Fig. 5 is a view, in section, of two links in position for being disconnected, and Fig. 6 is a section of a modified form of the bushing and end bar.

Each link is composed of two side bars, A A, either round in cross-section, or, preferably, oval in cross-section, connected at one end to a hook, A', the lip $a$ of which approaches the corresponding shoulder $a'$ to within a distance about equal to the shorter diameter of the side bars, A A, in cross-section. The hook is thus made to represent about five-sixths of a circle. B is a bushing, representing about the same proportion of a circle as is represented by the hook A', and of such external diameter as to fit closely within the hook, and of a length substantially corresponding to the width of the hook. The inside of the bushing is of such shape and size as to receive and fit closely the end bar, C, of the link, being provided, by preference, with ribs $b$, which enter corresponding grooves, which are lengthwise of the end bar, C, upon one or both sides.

The bushing may be secured in the hook by upsetting its ends sufficiently to prevent accidental removal, but without interfering with its rotating in the hook; and from an examination of Fig. 5 it will readily be seen that the bushing is turned into such position that its throat $b'$ forms a continuation of the throat of the hook, the end bar, C, of one of the hooks can be inserted within the bushing, and that when the links are straightened out the bushing will turn with the end bar, so that the inner face of said end bar will bear directly against the inside of the hook, and that the bushing is relieved from all strain; or, when preferred, the bushing may be provided with ribs or spurs $b^2$, cast upon its ends, which spurs may, after the bushing has been inserted within the hook, be bent in such manner as to retain the bushing in proper position.

By an examination of Fig. 4 it will be seen that when the links are at right angles to each other the hook overlaps the entire surface of the adjacent side of the end bar, which results partly from the hook being made of such size internally relative to the diameter of the end bar that the throat of the hook occupies but about one-sixth of a circle, and partly from the fact that the shoulder $a'$ is beveled so as to permit the lip $a$ to approach closely the horizontal plane of the upper face of the side bars, A A; but I do not wish to be limited to beveling this shoulder $a'$, because some of the advantages which are due to the increased internal diameter of the hook may be derived without this form of shoulder. Nor do I wish to be limited to the use of the ribs and grooves $b$ $c$, because if the end bars, C, be made slightly oval in cross-section and the opening in the bushing be made to fit closely thereto the bushing will turn with the end bar, and the link will be retained within the hook, except while the parts are in the positions shown in Fig. 5, in which positions they can be readily detached by slipping the end bar out through the throats of the bushing and hook. Where no unusual amount of slack is required this method of detaching will be satisfactory; but in cases where the slack is such that the links are liable to assume the position shown in Fig. 5, I prefer to employ the grooves and ribs, because their use necessitates not only placing the links at an acute angle to each other, but also by sliding the bar C out of the bushing by an endwise movement.

Neither do I wish to be limited to making the bars oval in cross-section, especially when the ribs and grooves are employed, because they will insure that the bushing will turn with the end bar, C. By making the outer side of the end bar angular and forming the inside of the bushing to correspond therewith, as shown in Fig. 6, I insure that the bushing shall turn with the end bar.

What I claim is—

1. An open chain-link having at one end a hook and at the other end a bar adapted to engage with a similar hook on another link, in combination with a bushing adapted to be interposed between the hook and end bar, substantially as set forth.

2. In a chain-link, the combination, with the hook A and bushing B, of a link provided with an end bar adapted to fit within the bushing and rotate said bushing in the hook, substantially as set forth.

3. In a chain-link, the combination, with the hook A, of the bushing B and an end bar constructed with interlocking surfaces, adapted to prevent the end bar from being moved through the throat of the bushing upon a line parallel with the side bars of the link, substantially as set forth.

In testimony that I claim the foregoing as my own I affix my signature in presence of two witnesses.

WM. H. DICKEY.

Witnesses:
   D. S. WOODS,
   GEO. S. BENNETT.